United States Patent
Amice et al.

(10) Patent No.: US 12,525,370 B2
(45) Date of Patent: Jan. 13, 2026

(54) DEVICE FOR CONTROLLING A PLURALITY OF NUCLEAR REACTORS

(71) Applicant: Electricite de France, Paris (FR)

(72) Inventors: Laurent Amice, Igny (FR); Thierry Lucidarme, Chevreuse (FR); Christopher John Wright, London (GB); Jan Jasper Van Den Berg, London (GB)

(73) Assignee: Electricite de France, Paris (FR)

( * ) Notice: Subject to any disclaimer, the term of this patent is extended or adjusted under 35 U.S.C. 154(b) by 516 days.

(21) Appl. No.: 17/914,110

(22) PCT Filed: Mar. 24, 2021

(86) PCT No.: PCT/FR2021/050510
§ 371 (c)(1),
(2) Date: Sep. 23, 2022

(87) PCT Pub. No.: WO2021/191564
PCT Pub. Date: Sep. 30, 2021

(65) Prior Publication Data
US 2024/0153657 A1    May 9, 2024

(30) Foreign Application Priority Data
Mar. 24, 2020 (FR) ..................... 2002862

(51) Int. Cl.
*G21D 3/00* (2006.01)
(52) U.S. Cl.
CPC ............ *G21D 3/001* (2013.01); *G21D 3/008* (2013.01)

(58) Field of Classification Search
CPC .............................. G21D 3/001; G21D 3/008
See application file for complete search history.

(56) References Cited

U.S. PATENT DOCUMENTS

| | | | |
|---|---|---|---|
| 5,311,562 A * | 5/1994 | Palusamy | G21C 17/00 60/660 |
| 2003/0086520 A1 | 5/2003 | Russell et al. | |
| 2012/0121055 A1 | 5/2012 | Yokoyama et al. | |
| 2014/0133618 A1 * | 5/2014 | Graham | G21D 3/008 376/207 |
| 2016/0189811 A1 | 6/2016 | Pottorf et al. | |
| 2018/0190395 A1 | 7/2018 | Clarkson et al. | |
| 2018/0190403 A1 * | 7/2018 | Mashio | G21C 17/00 |

FOREIGN PATENT DOCUMENTS

JP   2009193294 A   8/2009

OTHER PUBLICATIONS

International Search Report for Application No. PCT/FR2021/050510 mailed Aug. 31, 2021, 2 pages.
Search Report dated Sep. 5, 2025 from the Office Action for Chinese Application No. 202180037892.0 issued Sep. 10, 2025. 2 pages.

* cited by examiner

*Primary Examiner* — Sharon M Davis
(74) *Attorney, Agent, or Firm* — Lerner David LLP (57) ABSTRACT

The invention relates to a device for controlling a plurality of nuclear reactors, comprising, for each nuclear reactor, a plurality of sensors for measuring operating parameters as well a system for controlling the nuclear reactor.

4 Claims, 3 Drawing Sheets

DEVICE FOR CONTROLLING A PLURALITY OF NUCLEAR REACTORS

CROSS-REFERENCE TO RELATED APPLICATIONS

The present application is a national phase entry under 35 U.S.C § 371 of International Application No. PCT/FR2021/050510 filed Mar. 24, 2021, which claims priority from French Patent Application No. 2002862 filed Mar. 24, 2020, all of which are hereby incorporated herein by reference.

GENERAL TECHNICAL FIELD

The present invention relates to the field of the systems for controlling nuclear reactors, and more particularly of the predictive maintenance of the nuclear reactors.

PRIOR ART

The maintenance and the monitoring of the nuclear reactors are technically demanding fields due to the complexity of the reactors themselves. This complexity tends to increase the risk of human error during the maintenance and monitoring operations, particularly during some particularly repetitive and frequent steps. In addition, their complexity involves the use of a highly qualified and experienced personnel in a large number of different technical fields.

The current solutions consist of dedicating teams to the driving and monitoring of a reactor, and of assembling the equipment for the driving and the monitoring of a reactor in a single control room entirely dedicated to this only reactor. While these solutions may appear satisfactory in the case of the monitoring of high-power reactors located in an energy generation plant, they involve the continuous presence on site of an operating team for each nuclear reactor, which may be prove to be particularly expensive when the reactors are numerous and/or dispersed as in the case of Small Modular Reactors (SMR).

PRESENTATION OF THE INVENTION

In order to reduce the operating costs of the nuclear reactors while maintaining the necessary level of security, a first aspect therefore proposes a device for controlling a plurality of nuclear reactors, comprising for each nuclear reactor a plurality of sensors intended to measure operating parameters and a control system for controlling the nuclear reactor, characterized in that it further comprises:
  a monitoring system for monitoring a state of each nuclear reactor, in communication with all of the sensors of the plurality of nuclear reactors, and comprising a database of the state of the nuclear reactors, the database of the state of the nuclear reactors comprising, for at least one nuclear reactor and for at least one given instant, data relating to:
    a level of use of the nuclear reactor,
    a use of components of the nuclear reactor,
    the operating parameters of the nuclear reactor,
    a state of fuel of the nuclear reactor,
    planned changes in a rate of use of the nuclear reactor; and
  a planning system for planning maintenance operations, in communication with the monitoring system for monitoring the state of each nuclear reactor, comprising a database of the maintenance operations, in which data relating to the maintenance operations are recorded, as well as a human-machine interface (HMI) allowing a supervisor of the nuclear reactors to add data relating to the maintenance operations to the database of the maintenance operations, the data relating to the maintenance operations comprising:
    a maintenance operation to be carried out,
    a nuclear reactor on which the maintenance operation must be carried out,
    a time and a date at which this operation must be carried out.
device in which a level of importance for the proper operation of each nuclear reactor is assigned to the maintenance operations, the level of importance being critical and non-critical, for the maintenance operations being critical, the monitoring device leaves the control of each nuclear reactor to the control system or to the respective operating personnel of each of said nuclear reactors and collects the data measured by the sensors of the nuclear reactors, and for the maintenance operations being non-critical, the monitoring device delivers instructions or commands to the respective control systems for controlling the nuclear reactors, for the maintenance operations being critical as well as for the maintenance operations being non-critical, the planning system transmits to the nuclear reactors a planning of the maintenance operations corresponding to a standard planning of the maintenance operations defined for a selected reference nuclear reactor, or a planning personalized to each nuclear reactor depending on its state and the data recorded in the database of the state of the nuclear reactors.

The invention is advantageously completed by the following features, taken alone or in any one of their technically possible combination:
  The device for controlling a plurality of nuclear reactors comprises a monitoring system being single and central for the state of all of the nuclear reactors.
  The device for controlling a plurality of nuclear reactors comprises a planning system being single and central for planning the maintenance operations of all of the nuclear reactors.
  The device for controlling a plurality of nuclear reactors comprises a monitoring system dedicated for each nuclear reactor according to a distributed architecture.
  All of the monitoring systems for monitoring each nuclear reactor communicates via a data exchange network in order to update the database of the state of the nuclear reactors of each monitoring system depending on the evolution of the state of the other nuclear reactors of the plurality of nuclear reactors.
  The device for controlling a plurality of nuclear reactors comprises a planning system for planning the maintenance operations dedicated for each nuclear reactor according to a distributed architecture.
  All of the planning systems for planning the maintenance operations of each nuclear reactor communicates via a data exchange network in order to update the database of the maintenance operations of each monitoring system depending on the planned maintenance operations for the other nuclear reactors of the plurality of nuclear reactors.
  Each nuclear reactor communicates with the other ones via a data exchange network via an independent communication link which was the subject of a security association prior to the data exchanges, guaranteeing confidentiality, authentication and integrity of the communication.
  The nuclear reactors of the plurality of nuclear reactors are small modular reactors.

The maintenance operations to be carried out are either operations of inspecting an element of a nuclear reactor by an operating personnel of one of the nuclear reactors, or tests carried out automatically by the control system for controlling a nuclear reactor.

A level of importance for the proper operation of each nuclear reactor is assigned to the maintenance operations.

Two levels of importance are possible, these two being critical and non-critical.

The maintenance operations being critical are can concern the systems, structures or components related to safety, environment, security or availability:
the reactor in operation;
reactor safety or reactor safeguard systems;
a reactor protection system;
classified auxiliary systems:
  a ventilation,
  a control command,
  an electrical distribution,
  emergency diesels,
  refrigeration systems,
  a pumping station, and
  a confinement;
a turbo-alternator unit and its auxiliaries for the operation,
said turbo-alternator unit and its auxiliaries for the operation comprising:
  a condenser,
  a water station,
  a cooling circuit,
  a transformer, and
  a discharge station.

The maintenance operations being non-critical comprise the maintenance operations related to the other structures or components:
a setting of load settings or of frequency setpoints (remote setting);
a treatment of effluents and of waste;
a demineralization station;
a production of auxiliary steam;
site constructions;
general services.

For the maintenance operations being critical, the monitoring device leaves the control of each nuclear reactor to the control system or to the respective operating personnel of each of said nuclear reactors and simply collects the data measured by the sensors of the nuclear reactors, and for the maintenance operations being non-critical the monitoring device delivers instructions or commands to the respective control systems for controlling the nuclear reactors.

For the maintenance operations being critical or non-critical, the planning system transmits to the nuclear reactors concerned a planning of the maintenance operations corresponding to a standard planning of the maintenance operations defined for a selected reference nuclear reactor, or a planning personalized to each nuclear reactor depending on its state and depending on the data recorded in the database of the state of the nuclear reactors.

When a maintenance operation to be carried out is a test carried out automatically by the control system for controlling a reactor nuclear, the command making it possible to start a test process is sent directly by the control device.

When a maintenance operation or of inspecting of an element of a nuclear reactor is to be carried out or to be triggered by the operating personnel, the control device issues a notification to an address of the operating personnel indicating the maintenance operation or of inspecting of the element of the nuclear reactor to be carried out, the concerned nuclear reactor, as well as the time remaining before the time and date at which the maintenance operation or of inspecting of the element of the nuclear reactor must be carried out.

After carrying out a maintenance operation, a report of a progress of the maintenance operation is added to the data relating to the maintenance operation.

The report on the progress of the maintenance operation comprises, in the case of a test carried out automatically, a recording of the progress of the maintenance operation and the information relating to the results of the test.

The report on the progress of the maintenance operation comprises, in the case of an inspection of an element of the nuclear reactor, information relating to the state of the element of the nuclear reactor having been inspected.

Where appropriate, data relating to additional maintenance operations are automatically added following the addition of the report on the progress of a maintenance operation to the data relating to the maintenance operations.

The planning system for planning the maintenance operations learns, during its operation, which additional maintenance operations should be added automatically depending on a content of the report on the progress of a maintenance operation.

The learning can comprise:
an analysis of the content of all the reports on the progress of a maintenance operation recorded by the planning system for planning the maintenance operations in the database of the maintenance operations in order to determine new maintenance operations or changes in a frequency at which some maintenance operations must be carried out, or
a training of an artificial learning model from the data recorded by the planning system for planning the maintenance operations in the database of the maintenance operations in order to determine an optimal maintenance strategy.

According to a second aspect, the invention proposes a method for controlling a plurality of nuclear reactors, comprising for each nuclear reactor steps of measuring operating parameters using a plurality of sensors and of controlling said nuclear reactor, characterized in that it further comprises the following steps:
monitoring a state of each nuclear reactor, based on the information provided by all of the sensors of the plurality of nuclear reactors, and based on information contained in a database of the state of the nuclear reactors, the database of the state of the nuclear reactors comprising, for at least one nuclear reactor and for at least one given instant, data relating to:
a level of use of the nuclear reactor,
a use of components of the nuclear reactor,
the operating parameters of the nuclear reactor,
a state of fuel of the nuclear reactor,
planned changes in a rate of use of the nuclear reactor; and
planning maintenance operations, based on the information collected at the step of monitoring the state of each nuclear reactor and based on information contained in a database of the maintenance operations, in which data relating to the maintenance operations are recorded, taking into account data of the maintenance operations added by a human-machine interface (HMI) allowing a supervisor of the nuclear reactors to add data relating to the maintenance operations, the data relating to the maintenance operations comprising:

a maintenance operation to be carried out, a nuclear reactor on which the maintenance operation must be carried out, a time and a date at which this operation must be carried out, The method can further comprise the steps of seeking a level of importance for the proper operation of each nuclear reactor assigned to the maintenance operations, of discriminating between two possible levels of importance, these two possible levels of importance being a critical level of importance and a non-critical level of importance, for the critical operations the monitoring device leaves the control of each nuclear reactor to the control system or to the respective operating personnel of each of said nuclear reactors and simply collects the measured data, and for the non-critical operations the monitoring device can deliver instructions or commands to the respective systems for controlling the nuclear reactors corresponding to a standard planning of the maintenance operations defined for a selected reference nuclear reactor.

The advantages of the invention are multiple:

the progress and the result of the maintenance operations are recorded and analyzed.

some simple operations such as elementary tests or the reading of measurements or parameters are automated in order to minimize the risk of human error due to the repetitiveness of the tasks performed.

it is possible for a single team to monitor several nuclear reactors, thus reducing the costs of monitoring of the large reactor fleets.

the system is secure in order to ensure that no computer bug endangers the critical functions of the reactors, as well as to ensure better resistance to the acts of hacking.

PRESENTATION OF THE FIGURES

Other features and advantages of the present invention will appear upon reading the following description of one preferred embodiment. This description will be given with reference to the appended drawings in which.

DETAILED DESCRIPTION OF THE INVENTION

Architecture

Figure 1:
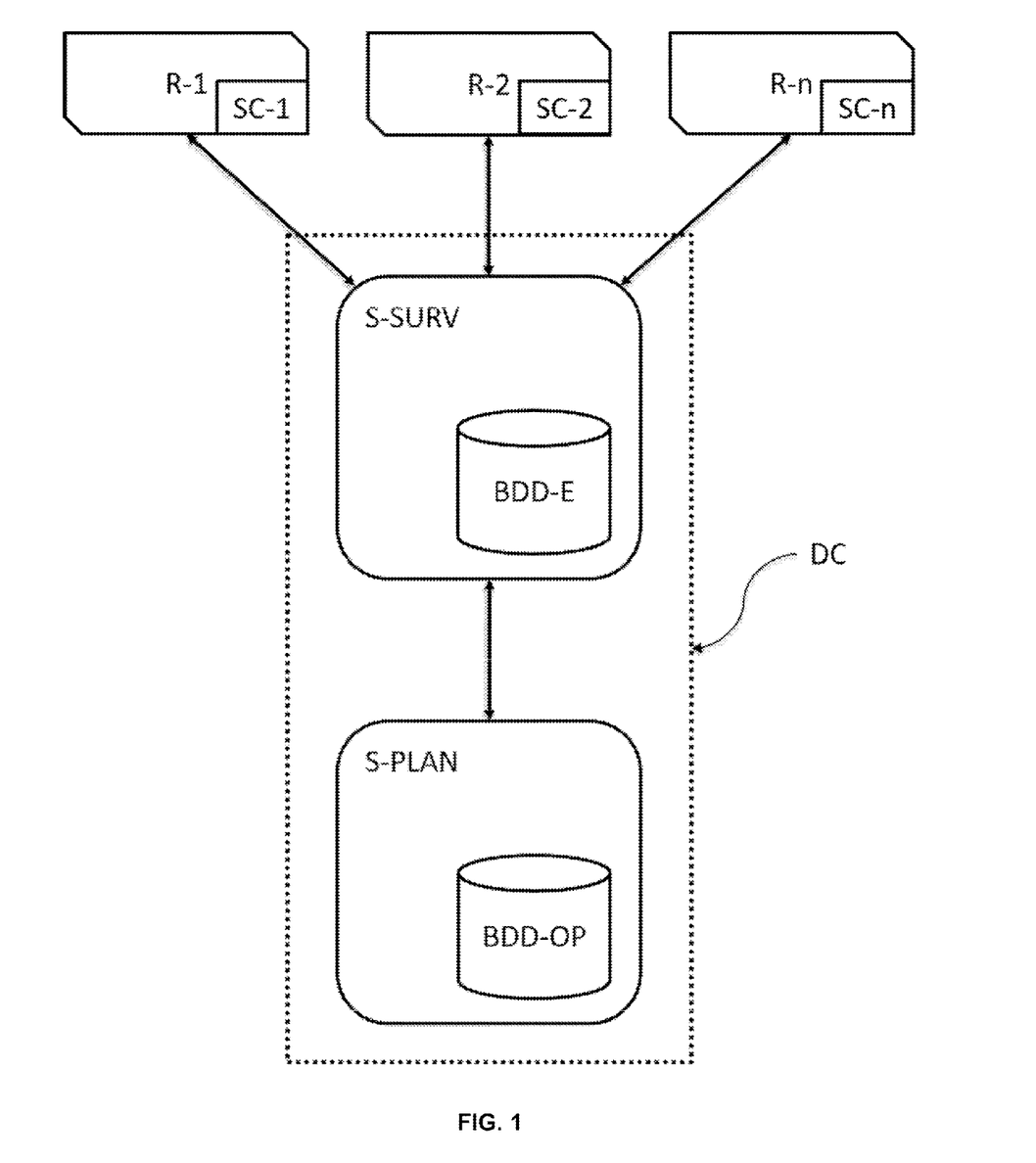
FIG. 1 is a diagram of a general architecture of a control device according to the invention.

With reference to FIG. 1, a device DC for controlling several nuclear reactors, dedicated to the monitoring and the maintenance, is organized according to the following general architecture:

n nuclear reactors R-1 to R-n, each piloted via a dedicated control system (SC-1 to SC-n), particularly these nuclear reactors can be small modular reactors;

a monitoring system S-SURV, intended to recover the data measured by the sensors of each reactor, comprising a database BDD-E of the state of the reactors, making it possible to store the history of the values measured by the sensors, as well as commands sent to all of the components of the reactor;

a system for planning the maintenance operations S-PLAN, intended to assist the personnel in charge of the reactors in the monitoring and maintenance of the reactors, comprising a database BDD-OP of the maintenance operations, making it possible to store information on the maintenance and monitoring operations to be carried out. The planning system also has a human-machine interface (HMI) either in the form of an independent device comprising screens as well as information input equipment, or in the form of software or of a Web application usable from a computer or a touch pad.

Figure 2A:
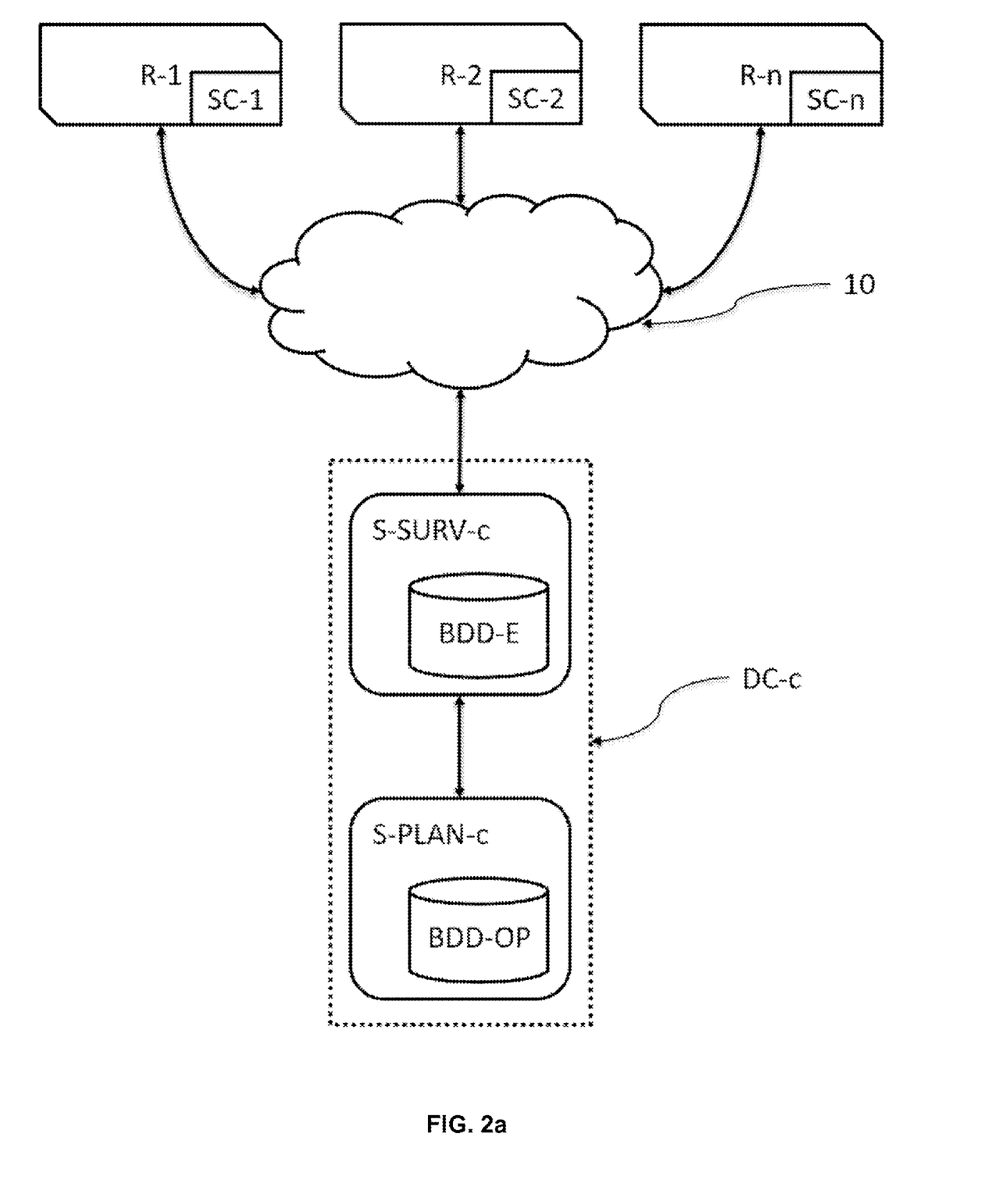
FIG. 2a is a diagram of a centralized architecture of a control device according to the invention.

This architecture can be implemented either in a centralized manner or in a distributed manner. Referring to FIG. 2a, in the case of a centralized architecture, a centralized control device DC-c is used. This centralized control device DC-c is composed of:

a centralized monitoring system S-SURV-c, which can consist of one or several computer servers, responsible for processing the data gathered on each of the reactors R-1 to R-n, by their associated control systems SC-1 to SC-n. The centralized monitoring system S-SURV-c further comprises the database BDD-E which can either be integrated in the form of one or several separate servers in communication with the centralized monitoring system S-SURV-c via a private local area network (LAN) having a star topology, or be installed on the same servers as the rest of the centralized monitoring system S-SURV-c;

a centralized planning system for planning the maintenance operations S-PLAN-c, which can consist of one or several computer servers, responsible for tracking and organizing the maintenance operations carried out on all of the reactors controlled by the device. This system is connected to the centralized monitoring system S-SURV-c by a private local area network (LAN) preferably having a star topology. The database BDD-OP can either be integrated in the form of one or several separate servers in communication with the centralized planning system S-PLAN-c for planning the maintenance operations via a private local area network (LAN), or be installed on the same servers as the rest of the centralized planning system S-PLAN-c for planning the maintenance operations.

It is also perfectly possible for the two (monitoring and planning) systems to be assembled in a single server.

The control device DC-c is connected to the control systems SC-1 to SC-n by a wide area network 10 such as a data exchange network. This network can be preferably a private data exchange network in order to ensure the security of the connected equipment, such as an "intranet" network via which encrypted data circulate either by a symmetric cryptography method (such as the AES, DES, Triple DES, etc. encryptions), or by an asymmetric cryptography method (such as the RSA encryption), in order to ensure the security of the installations connected to the data exchange network. In the context of using an asymmetric cryptography method, security associations are created prior to each data exchange between the centralized control device DC-c, and the control systems SC-1 to SC-n of the reactors. These security associations are based on security elements enrolled a priori in each party (DC-c, SC-n) such as large symmetric keys or certificates linking in a tamper-proof manner the identity of the parties with an asymmetric public key.

Figure 2B:
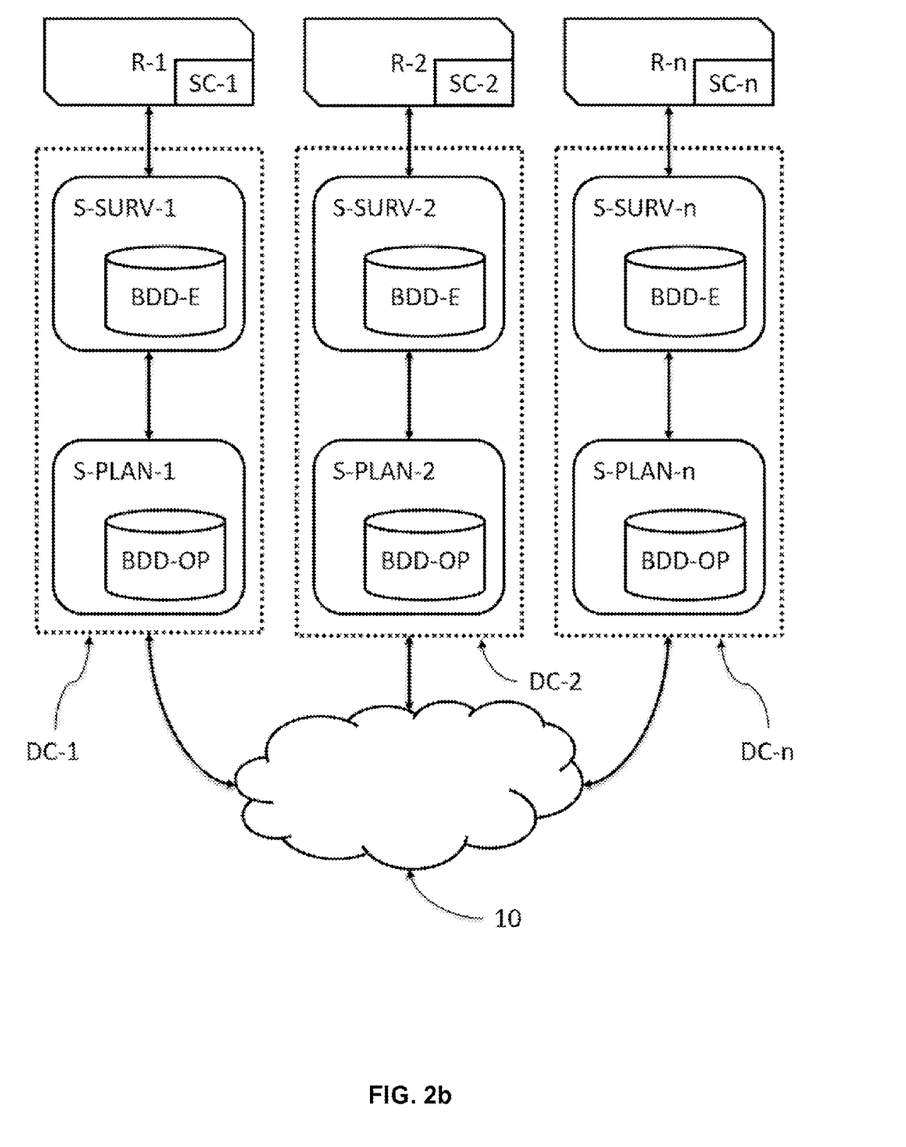
FIG. 2b is a diagram of a distributed architecture of a control device according to the invention.

Referring to FIG. 2b, in the case of a distributed architecture, a set of distributed control devices DC-1 to DC-n is used. These distributed control devices DC-1 to DC-n are each associated with a reactor. Each distributed control device, identified by DC-, is composed of:

a distributed monitoring system S-SURV-i, which can consist of one or several computer servers, responsible for processing the data gathered on the reactor R-i with which it is associated, by the associated control system SC-i. The distributed monitoring system S-SURV-i further comprises the database BDD-E which can either be integrated in the form of one or several separate servers in communication with the distributed monitoring system S-SURV-i via a private local area network (LAN) having a fully meshed topology in order to ensure better redundancy and thus more security, or be installed on the same servers as the rest of the distributed monitoring system S-SURV-i. In this embodiment, the database BDD-E is a distributed database that is to say the content of each instance of the database is the same, and comprises the data measured on all of the monitored reactors. Thus, when new data are added to one of the instances of the database or when existing data are modified or deleted from one of the instances of the database, this transaction is notified to the other instances and the information relating to the addition, deletion or modification are transmitted to the other instances by a wide area network 10 such as a data exchange network. This network can be either a private data exchange network of the intranet type in order to ensure the security of the connected equipments, via which encrypted data circulate or by a symmetric cryptography method (such as the AES, DES, Triple DES, etc. encryptions), or by an asymmetric cryptography method (such as the RSA encryption), in order to ensure the security of the installations connected to the data exchange network. In the context of using a symmetric or asymmetric cryptography method, security associations are created prior to each data exchange between the distributed control devices DC-1 to DC-n and the control systems SC-1 to SC-n for controlling the reactors. These security associations are based on security elements enrolled a priori in each party (DC-1 to DC-n, and SC-1 to SC-n) such as large symmetric keys or certificates linking in a tamper-proof manner the identity of the parties with an asymmetric public key;

a distributed system for planning the maintenance operations S-PLAN-i, which can consist of one or several computer servers, responsible for tracking and organizing the maintenance operations carried out on the reactor with which it is associated. This system is connected to the distributed monitoring system S-SURV-i by a private local area network (LAN) having a preferably fully meshed topology. The database BDD-OP can either be integrated in the form of one or several separate servers in communication with the distributed planning system S-PLAN-i for planning the maintenance operations via a private local area network (LAN), or be installed on the same servers as the rest of the distributed planning system S-PLAN-i for planning the maintenance operations. In this embodiment, the database BDD-OP is a distributed database that is to say the content of each instance of the database is the same, and comprises the data measured on all of the monitored reactors. Thus, when new data are added to one of the instances of the database or when existing data are modified or deleted from one of the instances of the database, this transaction is notified to the other instances and the information relating to the addition, deletion or modification are transmitted to the other instances by a wide area network 10 such as a data exchange network. This network can be either a private data exchange network in order to ensure the security of the connected equipments, via which encrypted data circulate, or by a symmetric cryptography method (such as the AES, DES, Triple DES, etc. encryptions), or by an asymmetric cryptography method (such as the RSA encryption), in order to ensure the security of the installations connected to the data exchange network;

It is also perfectly possible for the two (monitoring and planning) systems to be assembled in a single server.

Finally, it is also possible to merge the two types of architectures, this possibility proves to be particularly relevant when it is desired to control reactors present in several copies on different sites. In this case, all of the reactors present on the same site can be controlled by a centralized control device, and this centralized system forming itself part of a distributed control device.

Operation of the Monitoring System

At any time or periodically, the monitoring system is responsible for measuring and recording all the state and operating parameters of the reactor and its installation, these operating parameters being for example: —temperatures, pressures, flow rates, levels, power, chemistry, control parameters etc of the reactor and of its auxiliary circuits;

the neutronic parameters of the core: neutronic power, power distribution, position of the control rods, soluble boron concentration;

the state and the operating parameters of the turbo-alternator unit, of the water station, of the electrical network;

measurements made on the installation or on the site; weather, cold source temperature, radiation protection;

measurements of vibrations, performance or number of uses; —etc.

These operating parameters are recorded in the database of the state of the nuclear reactors with a certain time step (for example on the order of a second) and thus allow identifying the malfunction of a component, checking the operating history in the event of a technical incident as well as developing models in order to predict the future state of the reactor or its components.

Operation of the Planification System

The planning system for its part aims to ensure the robustness of the reactor maintenance process, these maintenance operations being either operations carried out by the operating personnel or tests carried out automatically by the equipments itself (for example a test of automatic sequence, of availability or of performance of a system). For that, it comprises a database of the maintenance operations in which are recorded all of the maintenance operations to be carried out on all the reactors as well as, for each maintenance operation, a deadline by which the operation must be carried out and information making it possible to identify the reactor on which the maintenance operation must be carried out. In addition, when a maintenance operation has been carried out, a recording is added to the database, either by the operating personnel or by reports automatically generated following the operations.

These recordings can be made in the form of forms completed by the operating personnel via portable terminals securely connected to the distributed communication network, and making it possible to validate or inform on the performed maintenance operations.

The planning system manages the maintenance operations that must be carried out periodically (for example every two months, every year, etc.). The planning system can also add maintenance operations to be carried out depending on the results of the maintenance operations carried out previously, depending on the operating history of the reactor, depending on the values of the operating parameters or depending on the evolution of these values or depending on the lessons learned from the other reactors (experience feedback). For example, if the planning system detects abnormally high vibrations in the turbine, the planning system can automatically add an operation of checking the state of the turbine to the database. In the same way, the planning system can add maintenance operations to be carried out when it detects excessively high temperature values, abnormal pressure variations, a malfunction of a component, or in the event of an incident that occurred on a neighboring reactor and which would require carrying out checks on the other reactors. The planning system can trigger an automatic complementary operation or to be carried out by the operating personnel.

Level of Criticality

Due to the sensitivity of the equipment under its control, the control system of the reactors must have information on the importance of the components it monitors to the proper operation of the reactors in order to know how to monitor them. For that, two levels of importance are assigned to the maintenance operations as well as to the components of the reactor: "critical" when the operation or the component is of critical importance for the proper operation of the reactor and "non-critical" otherwise. These levels of importance allow identifying which components of the reactor, or which maintenance operations require more attention, for example by requiring the intervention of a qualified supervisor, by only allowing software components that have been the subject of a formal check (for example by static analysis methods) to process the components or operations identified as "critical", or by simply collecting the measured data. It is also possible to only allow the device to supervise the "non-critical" maintenance operations and to leave the control of all the "critical" maintenance operations to the respective control systems of each of the reactors, and thus make the "critical" maintenance operations independent of the planning system. The maintenance operations that can be qualified as "critical" are those related to systems, structures or components related to safety, environment, security or availability such as:

the reactor in operation;
the reactor safety or safeguard systems;
the reactor protection system;
the classified auxiliary systems:
  the ventilation,
  the control command,
  the electrical distribution,
  the emergency diesels,
  the refrigeration systems,
  the pumping station, and
  the confinement;
the turbo-alternator unit and its auxiliaries for the operation:
  the condenser,
  the water station,
  the cooling circuit,
  the transformer, and
  the discharge station.

These components are classified as "critical".

Conversely, the maintenance operations that can be qualified as "non-critical" are those related to other structural systems or components such as:

the setting of the load settings or of frequency setpoints (remote setting);
the treatment of effluents and waste;
the demineralization station;
the production of auxiliary steam;
the site constructions;
the general services.

These components not being classified as "critical".

Improvement of the Device Over Time

The collection of data carried out such as physical measurements relating to a set of physical parameters, an accurate estimation of the temporal evolution of at least one of these measurements (temperature of the cooling circuit, current-voltage at the secondary, etc.) by the monitoring and planning systems is used to improve the detections of the malfunctions as well as to identify the actions to be taken following the detection of an anomaly. Indeed, the data recorded in the database of the state of the nuclear reactors can be combined with the data recorded in the database of the maintenance operations, and more particularly the reports on the progress of the maintenance operations allow for example establishing relationships between the values detected by the sensors of the reactors and the state of a component, or predicting the outcome of a test by applying automatic learning methods. For example by training an automatic learning model to the task of detecting abnormal drift of at least one of the measured parameters using recurrent neural networks, for example models of the LSTM (long short-term memory) type, GRU (gated recurrent unit) type, bidirectional recurrent networks. The use of such models allows, among other things, detecting malfunctions that are not detected by simpler methods such as tolerance margins associated with the parameters. The detection of malfunctions thus allows programing new inspection operations or new automatic tests to be carried out when the control device identifies a risk of malfunction.

Piloting of a Group of Nuclear Reactors

In order to simplify the management of the reactors by the operating teams, a method is also proposed consisting of modifying some operating parameters of the reactors so that all of the reactors of a group of nuclear reactors operates in a similar way, for example same load level, similar temperatures, similar water flow rate at the outlet of a pump, etc. This thus allows having similar levels of wear of the components on all of the reactors of the group of nuclear reactors, and thus predicting the state of the components of a reactor depending on the other reactors of the group, for example if a component breaks down on a reactor the control device will automatically program the inspection of this component on all of the reactors with similar operating parameters. This also allows "solidarity" operation of a group of reactors, in order for example to distribute the load or the response to load transients called by the network between the reactors: the most maneuvering reactor will be used in priority, sparing the reactors that could be in a more difficult situation to maneuver (because at the end of cycle, or in stable operation to carry out tests), compensation of a reactor in difficulty (or in incident) by the other ones, etc.

This adjustment of the operating parameters is further associated with an algorithm of creation of groups of reactors. This algorithm, based on the conventional data partitioning (clustering) methods, creates partitions of all of the nuclear reactors, these partitions being called clusters. Once a cluster has been created, it is always possible to add a new reactor thereto or to exclude a reactor forming part of the cluster, depending on the values of the operating parameters. Thus, if a reactor is subject to a much higher production request than the other reactors of the cluster, it may be excluded or reassigned to a new and more suitable cluster. For that, acceptable variation margins are associated with each operating parameter of the reactors, in order to allow deciding whether a given reactor can remain in its cluster or whether it must change it.

The invention claimed is:

1. A system for controlling a plurality of nuclear reactors, comprising:
   for each nuclear reactor
   a plurality of sensors intended to measure operating parameters;
   a control system for controlling the nuclear reactor;
      a monitoring system for monitoring a state of the nuclear reactor, in communication with the sensors of the nuclear reactors, and comprising a database of the state of the nuclear reactors, the database of the state of the nuclear reactors comprising, for at least one nuclear reactor and for at least one given instant, data relating to: a level of use of the nuclear reactor, a use of components of the nuclear reactor, the operating parameters of the nuclear reactor, a state of fuel of the nuclear reactor, and planned changes in a rate of use of the nuclear reactor; and
      a planning system for planning maintenance operations, in communication with the monitoring system, comprising
         a database of maintenance operations, in which data relating to the maintenance operations are recorded,
         a human-machine interface allowing a supervisor of the nuclear reactors to add data relating to the maintenance operations to the database of the maintenance operations, the data relating to the maintenance operations comprising:
            a maintenance operation to be carried out,
            a nuclear reactor on which the maintenance operation must be carried out, and
            a time and a date at which this maintenance operation must be carried out, and
         a device in which a level of importance is assigned to the maintenance operations, the level of importance being either critical or non-critical,
   wherein:
   the monitoring systems and the planning system are dedicated for each nuclear reactor according to a distributed architecture and all of the monitoring systems and the planning systems communicate via a data exchange network and are configured to update the databases of each monitoring system and of each planning system depending on the evolution of the state and planned maintenance operations of the other nuclear reactors of the plurality of nuclear reactors,
   for the maintenance operations having the critical level of importance the monitoring device is configured to collect data measured by the sensors of the nuclear reactor and allow the control system or respective operating personnel of the nuclear reactor to control the nuclear reactor,
   for the maintenance operations having the non-critical level of importance the monitoring device is configured to deliver instructions or commands to the control systems,
   for the maintenance operations having the critical level of importance and for the maintenance operations having the non-critical level of importance, the planning system is configured to transmit to the nuclear reactor a planning of the maintenance operations corresponding to a standard planning of maintenance operations defined for a selected reference nuclear reactor, or a planning personalized to the nuclear reactor depending on its state and depending on the data recorded in the database of the state of the nuclear reactors.

2. The system for controlling a plurality of nuclear reactors according to claim 1, wherein the nuclear reactors of the plurality of nuclear reactors are small modular reactors.

3. A method for controlling a plurality of nuclear reactors, using the system according to claim 1,
   wherein the method comprises for each nuclear reactor the following steps:
      measuring operating parameters using the plurality of sensors,
      controlling the nuclear reactor,
         monitoring by the monitoring system the state of the nuclear reactor, based on the information provided by the sensors of the nuclear reactors, and based on information contained in the database of the state of the nuclear reactors, and
         planning maintenance operations by the planning system, based on information collected at the step of monitoring the state of the nuclear reactor and based on information contained in the database of maintenance operations, in which data relating to the maintenance operations are recorded, taking into account data of the maintenance operations added by the human-machine interface allowing a supervisor of the nuclear reactors to add data relating to the maintenance operations,
      making all of the monitoring systems and the planning systems communicate via a data exchange network and updating the databases of each monitoring system and of each planning system depending on the evolution of the state and planned maintenance operations of the other nuclear reactors of the plurality of nuclear reactors.

4. The method according to claim 3, further comprising the steps:
   seeking the level of importance assigned to the maintenance operations,
   discriminating between a critical level of importance and a non-critical level of importance,
   for the maintenance operations having the critical levels of importance, collecting data measured by the sensors of the nuclear reactor and allowing the control system or respective operating personnel of the nuclear reactor to control the nuclear reactor, and
   for the maintenance operations having the non-critical levels of importance, delivering instructions or commands to the control systems,
   for the maintenance operations having the critical level of importance and for the maintenance operations having the non-critical level of importance, transmitting by the planning system to the nuclear reactor the planning of the maintenance operations corresponding to the standard planning of the maintenance operations defined for the selected reference nuclear reactor or the planning personalized to the nuclear reactor depending on its state and depending on the data recorded in the database of the state of the nuclear reactors.

\* \* \* \* \*